Patented Mar. 25, 1952

2,590,816

UNITED STATES PATENT OFFICE 2,590,816

2,2'-DIHYDROXY-3-HYDROXYMETHYL-5,5'-DICHLORODIPHENYLMETHANE

Herman E. Faith, New Palestine, Ind., assignor to Allied Laboratories, Inc., Kansas City, Mo., a corporation of Delaware No Drawing. Application June 23, 1950, Serial No. 170,034

1 Claim. (Cl. 260—619)

This invention relates to the new compound 2,2'-dihydroxy-3-hydroxymethyl-5,5'-dichlorodiphenylmethane and a method for its preparation.

Zinke and Hanus Berichte, 74B, 211 (1941), treated 2,2'-dihydroxy-5,5'-dichlorodiphenylmethane with an excess of formaldehyde in the presence of methanol as a catalyst and at a temperature of 30-40° C. to obtain 2,2'-dihydroxy-3.3'-dihydroxymethyl-5,5'-dichlorodiphenylmethane. In the present invention, it was discovered that 2,2'-dihydroxy-3-hydroxymethyl-5,5'-dichlorodiphenylmethane was obtained as the chief product when an aqueous solution of the sodium salt of 2,2'-dihydroxy-5,5'-dichlorodiphenylmethane was treated with formaldehyde. It was surprising that the monohydroxymethyl derivative was obtained since it was expected that the dihydroxymethyl would be the chief product.

The method for carrying out the present invention will be described in more detail in conjunction with the following specific example—it being understood that it is given by way of illustration and not limitation.

*Preparation of 2,2'-dihydroxy-3-hydroxymethyl-5,5'-dichlorodiphenylmethane*

2,2'-methylenebis(4-chlorophenol) (29.9 g.) is dissolved in a solution consisting of 80 ml. of water, 8.8 g. of sodium hydroxide and 15.6 ml. of 40% formaldehyde solution. The reaction solution is allowed to stand at 25-30° C. for four days and is then diluted with water and acidified with 50% acetic acid. The white precipitate is filtered from the liquid and is washed with water. After it is dry, the product is extracted with hot benzene and filtered from some insoluble material. The filtrate is cooled somewhat and the first fraction of crystals is obtained by filtering. These low melting crystals are discarded and on further cooling the filtrate yields crystals which melt from 155-165° C. The latter product is recrystallized from benzene to give pure 2,2'-dihydroxy-3-hydroxymethyl-5,5'-dichlorodiphenylmethane, melting at 165-167° C. This product is soluble in dilute alkali and is insoluble in cold water.

The compound 2,2'-dihydroxy-3-hydroxymethyl-5,5'-dichlorodiphenylmethane, prepared as described, has been found to possess valuable pharmaceutical properties which render it espectially useful as an antibacterial and fungicidal agent. The compound is also suitable for the preparation of more complex organic derivatives.

I claim:

The compound 2,2'-dihydroxy-3-hydroxymethyl-5,5'-dichlorodiphenylmethane.

HERMAN E. FAITH.

REFERENCES CITED

The following references are of record in the file of this patent:

Granger, Industrial and Engineering Chemistry, volume 24, pages 442-448 (1932).